United States Patent
Muirhead-Gould

(10) Patent No.: US 10,176,442 B2
(45) Date of Patent: Jan. 8, 2019

(54) SYSTEM AND METHOD FOR MATCHING RESOURCE CAPACITY WITH RESOURCE NEEDS

(71) Applicant: Magna Services, LLC, Delaware, OH (US)

(72) Inventor: John Muirhead-Gould, Delaware, OH (US)

(73) Assignee: Magna Services, LLC, Delaware, OH (US)

( * ) Notice: Subject to any disclaimer, the term of this patent is extended or adjusted under 35 U.S.C. 154(b) by 228 days.

(21) Appl. No.: 15/250,282

(22) Filed: Aug. 29, 2016

(65) Prior Publication Data

US 2017/0060985 A1    Mar. 2, 2017

Related U.S. Application Data

(60) Provisional application No. 62/211,487, filed on Aug. 28, 2015.

(51) Int. Cl.
| | | |
|---|---|---|
| *G06F 17/30* | (2006.01) | |
| *G06Q 10/06* | (2012.01) | |
| *G06F 17/27* | (2006.01) | |

(52) U.S. Cl.
CPC . *G06Q 10/063112* (2013.01); *G06F 17/2765* (2013.01); *G06F 17/30386* (2013.01); *G06F 17/30598* (2013.01); *Y04S 50/00* (2013.01)

(58) Field of Classification Search
CPC ......... G06F 17/30386; G06F 17/30598; G06F 17/30; G06Q 10/063112

(Continued)

(56) References Cited

U.S. PATENT DOCUMENTS 6,272,467 B1    8/2001    Durand et al.
7,392,197 B1    6/2008    Fliess et al.
(Continued)

FOREIGN PATENT DOCUMENTS

CA    2637028 A1    7/2007

OTHER PUBLICATIONS

Boland, Michael, Bia Kelsey, "Local On-Demand Economy: The Uberfication of Local Services" Insight Paper, Mar. 2015, 5 pages.

*Primary Examiner* — Isaac M Woo
(74) *Attorney, Agent, or Firm* — Kolisch Hartwell, P.C.

(57) ABSTRACT

Resources are required to satisfy various needs and wants of people, businesses, and machines. Resources come in the forms of time, talents, money, materials, energy, services, people, knowledge, communication, and other tangible and intangible assets. When both the capacities and the needs of multiple resources are stored in a way that allows for them to be connected together using computers, they can be efficiently and effectively matched. This matching creates shared value, which has potential academic, economic, societal and philanthropic benefits. Connected computer system(s) can query and match resources together in a way that is mutually beneficial. While a common lexicon is the simplest way to perform the matching, natural language processing, machine translation, or use of similar technologies may be optimal. Any method of collecting these inputs should be able to handle one or multiple capacities, and one or multiple needs.

20 Claims, 8 Drawing Sheets

(58) Field of Classification Search
USPC .................................................. 707/600–899
See application file for complete search history.

(56) References Cited

U.S. PATENT DOCUMENTS

| | | | |
|---|---|---|---|
| 7,945,522 B2 | 5/2011 | McGovern et al. |
| 8,060,451 B2 | 11/2011 | Degeratu et al. |
| 8,104,038 B1 | 1/2012 | Graupner |
| 8,244,622 B2 | 8/2012 | Hughes, Jr. et al. |
| 8,332,418 B1 | 12/2012 | Giordani et al. |
| 8,620,829 B2 | 12/2013 | McGovern et al. |
| 8,645,312 B2 | 2/2014 | Flinn et al. |
| 8,768,802 B2 | 7/2014 | Engle et al. |
| 2001/0039527 A1 | 11/2001 | Ordish et al. |
| 2003/0115157 A1 | 6/2003 | Circenis |
| 2005/0038684 A1 | 2/2005 | Wang et al. |
| 2005/0044012 A1 | 2/2005 | Huang et al. |
| 2006/0178931 A1 | 8/2006 | Horn |
| 2006/0229896 A1 | 10/2006 | Rosen et al. |
| 2007/0203769 A1 | 8/2007 | Thomas |
| 2008/0183540 A1 | 7/2008 | Lewis |
| 2008/0288317 A1 | 11/2008 | Kakar |
| 2009/0018965 A1 | 1/2009 | Neydavood |
| 2009/0043636 A1 | 2/2009 | Hansen |
| 2009/0248186 A1 | 10/2009 | Hamling |
| 2009/0327459 A1 | 12/2009 | Yoo et al. |
| 2010/0121678 A1 | 5/2010 | McCormick |
| 2010/0274623 A1 | 10/2010 | Thomas |
| 2010/0280884 A1 | 11/2010 | Levine et al. |
| 2011/0218852 A1 | 9/2011 | Zhang et al. |
| 2013/0006771 A1 | 1/2013 | Parikh |
| 2013/0073328 A1 | 3/2013 | Ehrler et al. |
| 2013/0311346 A1 | 11/2013 | Winter |
| 2013/0346587 A1 | 12/2013 | Barkett et al. |
| 2014/0067816 A1* | 3/2014 | Kanungo ............. G06F 17/274 707/740 |
| 2014/0074560 A1 | 3/2014 | B'Far et al. |
| 2014/0101471 A1 | 4/2014 | Bieswanger et al. |
| 2014/0129459 A1 | 5/2014 | Baudy et al. |
| 2014/0149217 A1 | 5/2014 | Steenstra et al. |
| 2015/0006211 A1 | 1/2015 | Santos et al. |
| 2015/0039526 A1 | 2/2015 | Davidson |
| 2015/0052081 A1 | 2/2015 | Duron et al. |
| 2015/0120420 A1 | 4/2015 | Richter |
| 2015/0127565 A1 | 5/2015 | Chevalier et al. |
| 2015/0220587 A1 | 8/2015 | Dunn |
| 2015/0248646 A1 | 9/2015 | Avats |

* cited by examiner

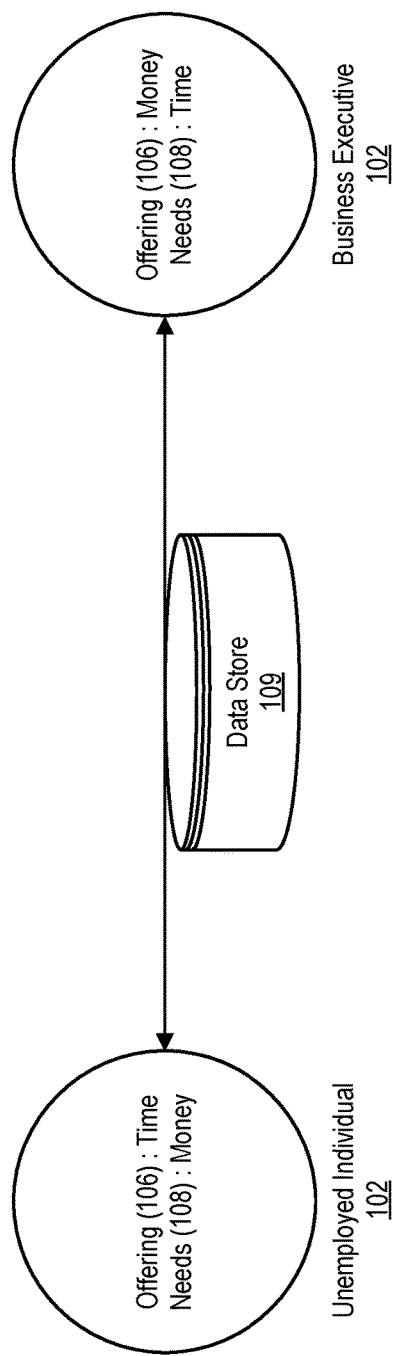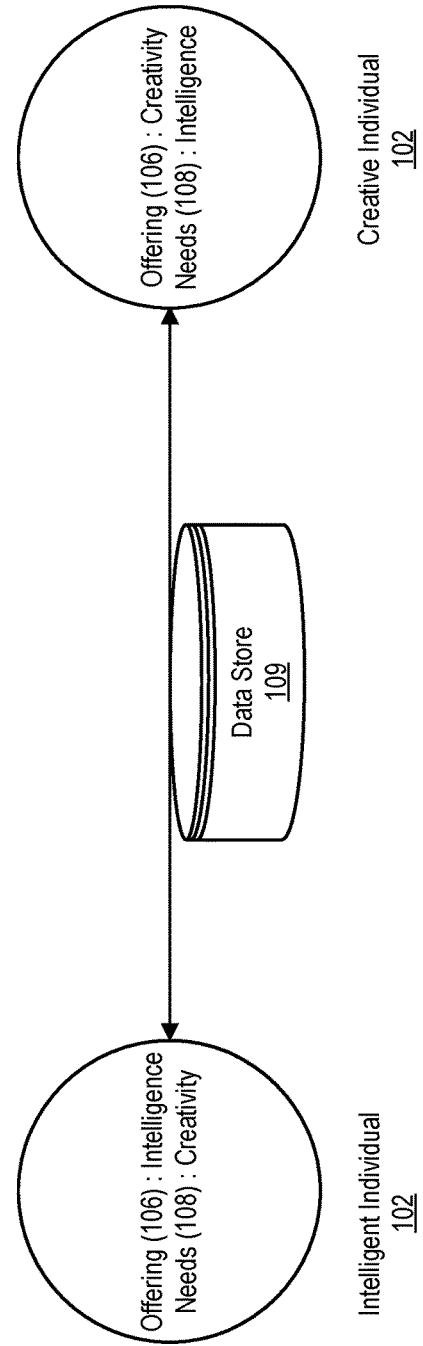

SYSTEM AND METHOD FOR MATCHING RESOURCE CAPACITY WITH RESOURCE NEEDS

CROSS-REFERENCES TO RELATED APPLICATIONS

This application claims the benefit under 35 U.S.C. § 119(e) of U.S. Provisional Patent Application Ser. No. 62/211,487, filed Aug. 28, 2015 and entitled "SYSTEM AND METHOD FOR MATCHING RESOURCE CAPACITY WITH RESOURCE NEEDS", the disclosure of which is herein incorporated by reference.

FIELD OF THE INVENTION

The present invention relates generally to a system and method for matching client resource capacity with client resource needs. In particular, the present invention relates to a host system and method for storing client data inputs, assessing and categorizing the client data inputs to create processed client data, matching the processed client data based on the predetermined parameters to create matching output data, and providing the matching output data to the corresponding clients.

BACKGROUND OF THE INVENTION

The Resources are required to satisfy various needs and wants of people, businesses, and machines. Resources come in the form of time, talents, money, materials, energy, services, people, knowledge, communication, and other tangible and intangible assets. While resource requirements and capacities are often generally known, they are often not specifically articulated. Although resource availability and needs can be generally advertised, there lacks an easy to use host system and method to assess and match clients' specific resource capacities with other clients' correspondingly specific resource needs.

Numerous innovations for capacity and demand matching systems have been provided as described below. Even though these innovations may be suitable for the specific purposes to which they address, they differ significantly from the present invention.

U.S. Pat. No. 8,645,312, to Flinn et al., teaches methods and systems for generating personalized recommendations with an enhanced capacity for beneficial serendipity may be applied to enhance personalization functions; U.S. Pat. No. 8,332,418, to Giordani et al., teaches a method and system for matching people by obtaining, for a set of people, response information associated with previous matches the set of people have been a part of; and U.S. published patent application. No. 2,015,127,565, to Chevalier et al., teaches a method and system for matching people, companies, organizations, and/or the like that may benefit from being connected using a social platform.

Thus there remains a need for a system and method to provide host assessment, categorization and matching of client resource capacity data with client resource needs data. The host system provides client data storage and processing of both the capacity and the needs of multiple resources in a way that allows for the client data to be cross-referenced, then efficiently and effectively matched. This matching creates shared value, which has potential economic, societal, academic, & philanthropic benefits.

Numerous innovations for demand and capacity matching systems have been provided in the prior art that are adequate for various purposes. Even though these innovations may be suitable for the specific purposes they address, they differ from the present invention and would not be suitable for the purposes of the present invention as heretofore described.

SUMMARY OF THE INVENTION

The present invention discloses about a system and method for matching resource capacity with resource needs, wherein the system comprises a host system and method for storing client data inputs, assessing and categorizing the client data inputs to create processed client data, matching the processed client data based on the predetermined parameters to create matching output data, and providing the matching output data to the corresponding clients.

According to the present invention the method and system comprise a capacity and need matching system and method, wherein the system and method comprises multiple entities, wherein each entity provides input data including one or more capacities and one or more needs as well as predetermined parameters; a computer-readable non-transitory memory to receive and store the input data including the capacities and the needs of the entities; and a processor that categorizes the stored capacities and the needs of the entities to generate a processed data, wherein the processor compares the processed data and matches the processed data capacities of one or more entities to corresponding processed data needs of other entities based on the predetermined parameters to generate matched data, further based on the matched data, the processor generates matched output data and transmits the matched output data to the respective entities.

Other features and aspects of the invention will become apparent from the following detailed description, taken in conjunction with the accompanying drawings, which illustrate, by way of example, the features in accordance with embodiments of the invention. The summary is not intended to limit the scope of the invention, which is defined solely by the claims attached hereto.

BRIEF DESCRIPTION OF THE DRAWINGS

The Further features of the present invention will become apparent to those skilled in the art to which the present invention relates from reading the following specification, by way of example, with reference to the accompanying drawings, in which:

FIG. 5a and FIG. 5b are schematic diagrams showing examples of matching of clients with time/money or talent resource capacity to clients with time/money or talent resource needs;

Like reference numerals refer to like parts throughout the various views of the drawings.

DETAILED DESCRIPTION OF THE INVENTION

Figure 1:
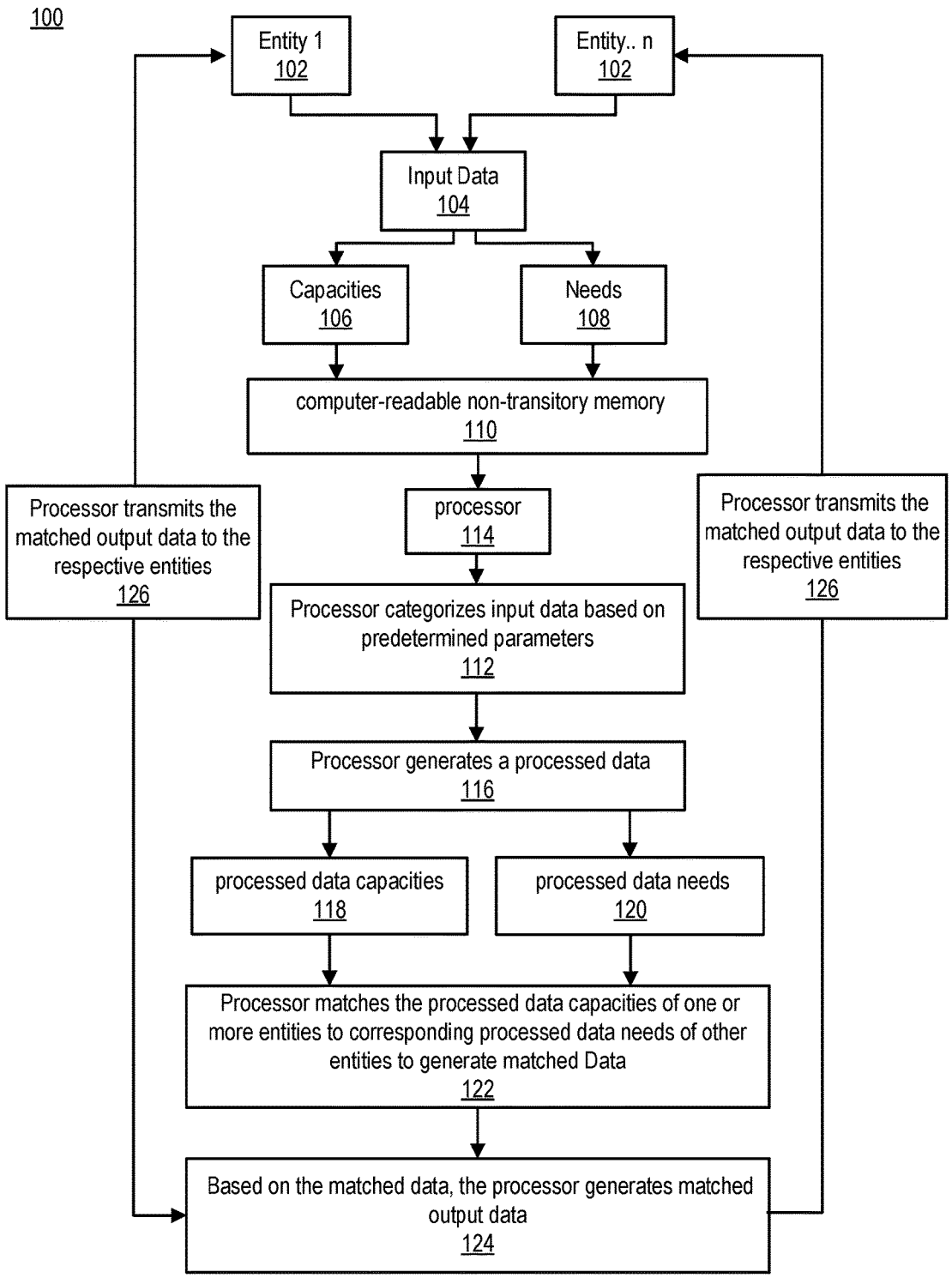
FIG. 1 is a schematic diagram showing a flow diagram of the invention for matching one or more capacities and one or more needs of entities according to an embodiment of the present invention.

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. Furthermore, there is no intention to be bound by any expressed or implied theory presented in the preceding technical field, background, brief summary or the following detailed description. It is also to be understood that the specific systems and methods illustrated in the attached drawings, and described in the following specification, are simply exemplary embodiments of the inventive concepts defined in the appended claims. Specific examples and other characteristics relating to the embodiments disclosed herein are therefore not to be considered as limiting, unless the claims expressly state otherwise.

In one aspect of the invention, as shown in FIGS. 1-8 illustrate a capacity and need matching system 100, wherein the system 100 comprising, multiple entities 102, wherein each entity 102 provides input data 104 including one or more capacities 106 and one or more needs 108 according to predetermined parameters 112; a computer-readable non-transitory memory 110 to receive and store the input data 104 including the capacities 106 and the needs 108 of the entities 102; and a processor 114 categorizes the stored capacities 106 and the needs 108 of the entities 102 to generate a processed data 116, wherein the processor 114 compares the processed data 116 and matches the processed data capacities 118 of one or more entities 102 to corresponding processed data needs 120 of other entities 102 based on the predetermined parameters to generate matched data 122, further based on the matched data 122, the processor 114 generates matched output data 124 and transmits 126 the matched output data 124 to the respective entities 102.

The entities 102 of the systems 100 are an individual person or a group of people or a society or any resources, clients such as client users, business clients, customer clients or the like or an organization or an institution or a machine like a business system or a computer or a robot or the like who have specific one or more capacities 106 or needs 108 or both. Wherein the capacities 106 and needs 108 are resources that come in the forms of time, talents, money, materials, energy, services, people, knowledge, communication, and other tangible and intangible assets.

In another aspect of the invention, as showing in FIG. 1, illustrates a method for matching one or more capacities 106 and one or more needs 108 of entities 102 comprising, providing input data 104 including one or more capacities 106 and one or more needs 108 of each entity 102 according to predetermined parameters 112; receiving and storing the input data 104 including the capacities 106 and the needs 108 of the entities 102 in a computer-readable non-transitory memory 110; and categorizing the stored capacities 106 and the needs 108 of the entities 102 to generate a processed data 116 by a processor 114, wherein the processor 114 compares the processed data 116 and matches the processed data capacities 118 of one or more entities 102 to corresponding processed data needs 120 of other entities 102 based on the predetermined parameters 112 to generate matched data 122, further based on the matched data 122, the processor 114 generates matched output data 124 and transmits 126 the matched output data 124 to the respective entities 102.

In one embodiment, a host system 100 may include a data store 109 having a provider processor 114 and one or more provider database storage units 110. Entities 102 such as client users access the host system and provide client resource input data 104 according to predetermined parameters 112. The client resource input data 104 is stored on the provider database storage units 110. The provider processor 114 assesses and categorizes the client resource input data 104 to create processed client data 116. The provider processor 114 compares the processed client data 116 and matches the processed client data capacities 118 to corresponding process client data needs 120 based on the predetermined parameters 112. Upon matching of processed client data 116 and utilizing the matched data 122, the provider processor 114 generates matching output data 124. The host system 100 provides the matching output data 124 to the corresponding clients/entities 102 to guide the clients 102 in selection of the appropriate resources match.

Various predetermined parameters associated with the entities 102 may be used in the assessment to provide the most effective matches for presentation of the matching output data 124 to the clients/users/entities 102. Examples of predetermined parameters associated with the entities 102 may include location (e.g. local vs. distant), language, communication preferences (e.g. voice, text, email, in-person), demographic factors (e.g. education level, occupation, household size/status, values), & business characteristics (number of employees, market area, ownership, workforce structure, competencies). Other types of parameters may be used in the assessment. These parameters and the full set of system capacities and needs are categorized 112 by the processor 114.

Figure 2:
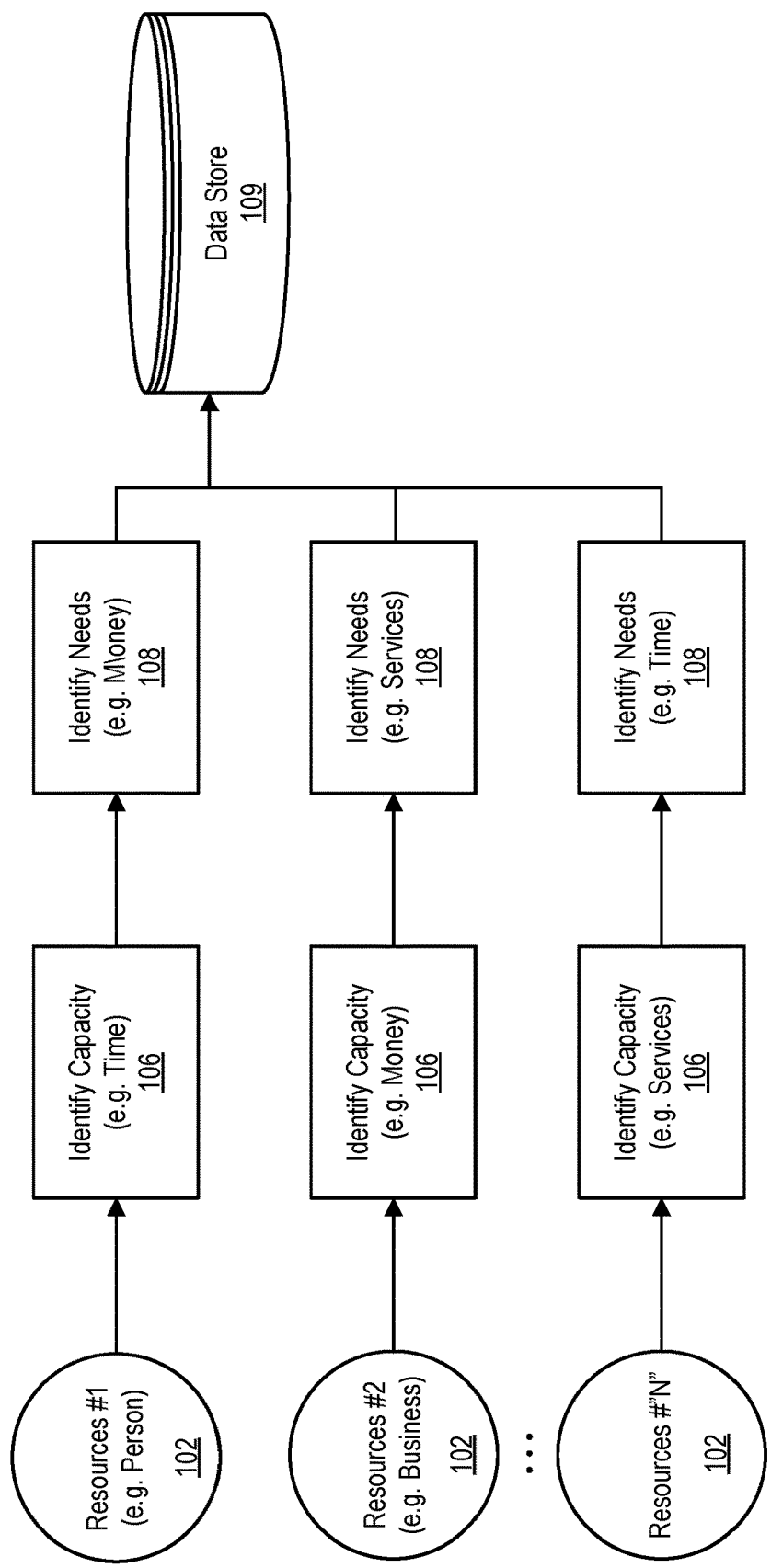
FIG. 2 is a schematic diagram showing an example of client resource input data provided to a provider data store according to an embodiment of the present invention.

FIG. 2 is a schematic diagram showing an example of client resource input data 104 provided to a provider data store 109 by one or more resources/entities 102 comprising a computer-readable non-transitory memory 110 and a processor 114 embedded in a data store (e.g. laptop, desktop, mobile phone, tablet, server) 109 for storing and processing the input data 104 according to an embodiment of the present invention.

Figure 3:
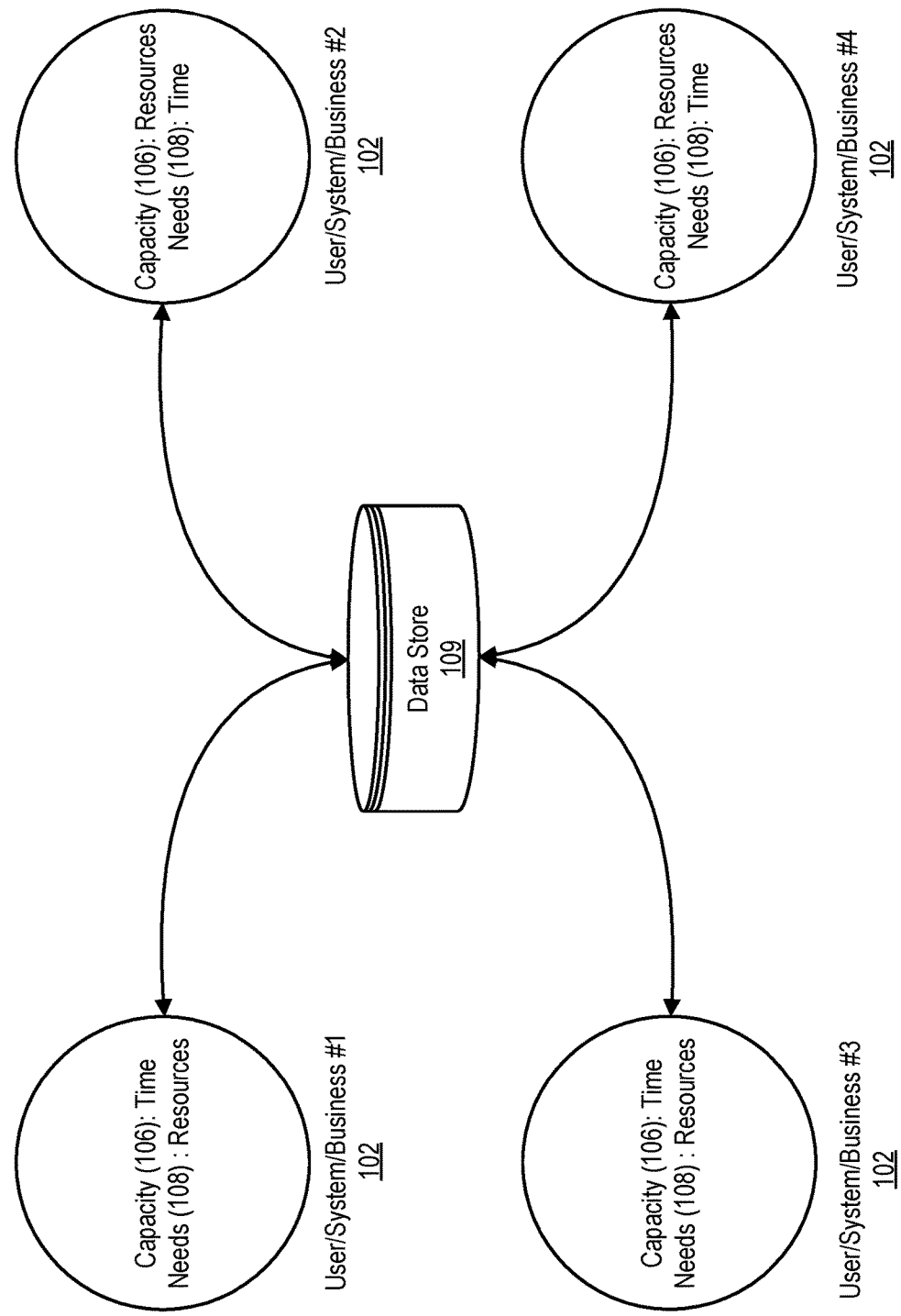
FIG. 3 is a schematic diagram showing an example of assessment, categorization and matching of client resource input data by the data store providing matching output data available to the clients according to an embodiment of the present invention.

FIG. 3 is a schematic diagram showing an example of assessment, categorization and matching of client resource input data 104 by the processor 114 of data store/server 109 providing matching output data 124 available to the clients/entities 102 according to an embodiment of the present invention.

Figure 4:
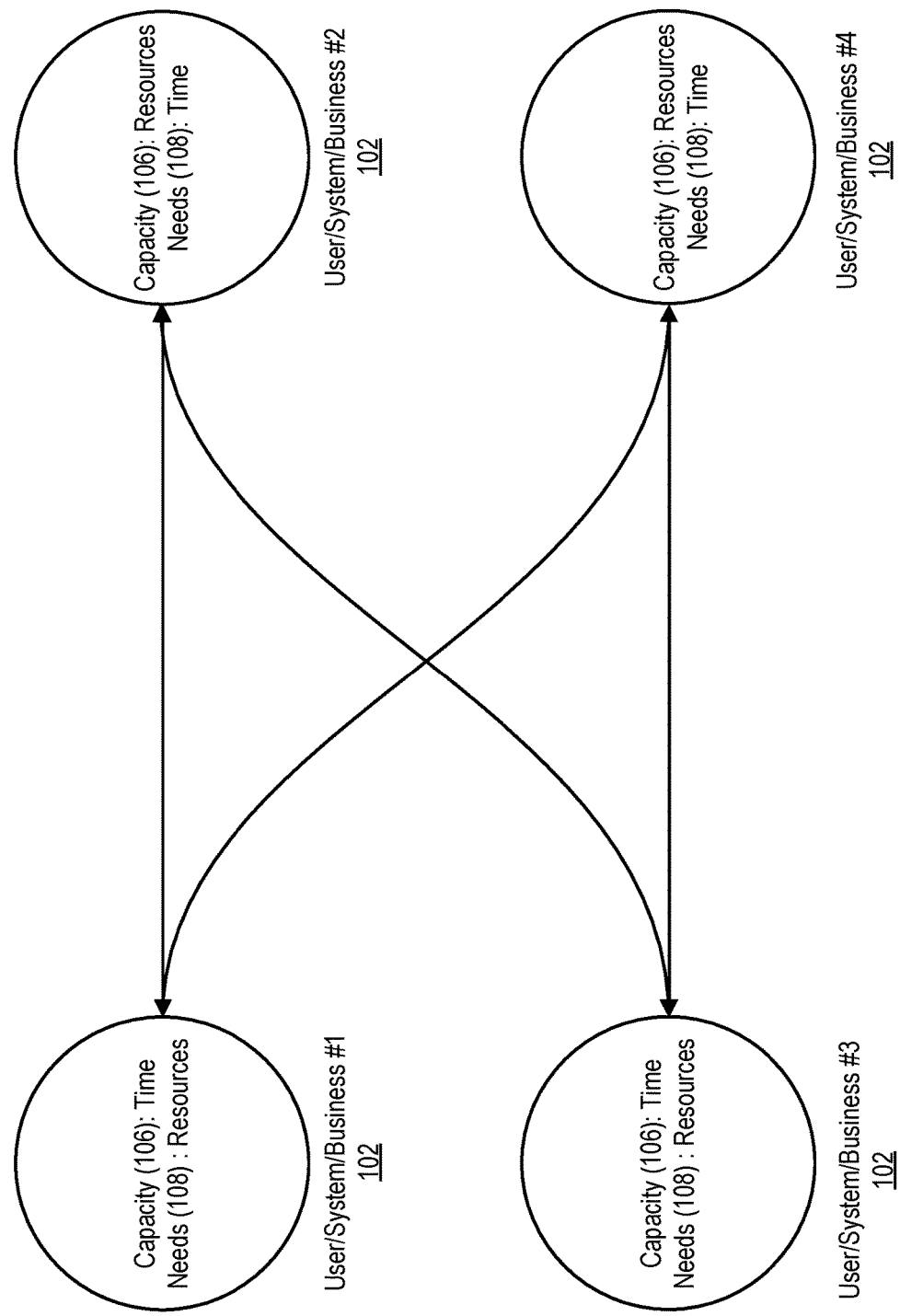
FIG. 4 is a schematic diagram showing an example of the availability of matching output data to the clients.

FIG. 4 is a schematic diagram showing an example of the availability of matching output data 124 to the clients/entities 102 to help each other and create optimal pairings so as to create mutual value for each other.

For an example as illustrated in FIG. 5a showing matching, two types of clients/entities 102 may include unemployed individuals and business executives. Some business executives have little time and some discretionary income. These executives may want to input 104 into a computer system their resource capacity 106, "$100 per month" and their resource needs 108, "time". Some currently unemployed individuals have the capacity to provide time-saving services that can be made available to these business executives. These individuals may want to input 104 into the same (or a connected) computer system their various resource capacities 106, e.g. "Car Detail & Washing", "House Cleaning", "Home Organization", "Grocery Delivery". The computer system(s) can query and match resources together in a way that is mutually beneficial. While a common lexicon is the simplest way to perform the matching, natural language processing, machine translation, or use of similar technologies may be optimal.

In another example, matching two individual clients/entities 102 may have compatible talents as illustrated in FIG. 5b. A first client may need creative assistance in starting his business, and is skilled with computers. He can input into the computer system his resource capacity 106, "intelligence with computers", and his needs 108, "creativity in business planning". A second client may be an experienced entrepreneur and needs help with computers. She can input into a connected computer system her resource capacity 106, "entrepreneurship", and her resource needs 108, "intelligence with computers". The connected computer systems can use natural language processing or machine translation to match the first client and the second client together in a way that is mutually beneficial, even though the exact terms may vary. The first client may receive computer help, and the second client may receive help starting his business.

Figure 6A:
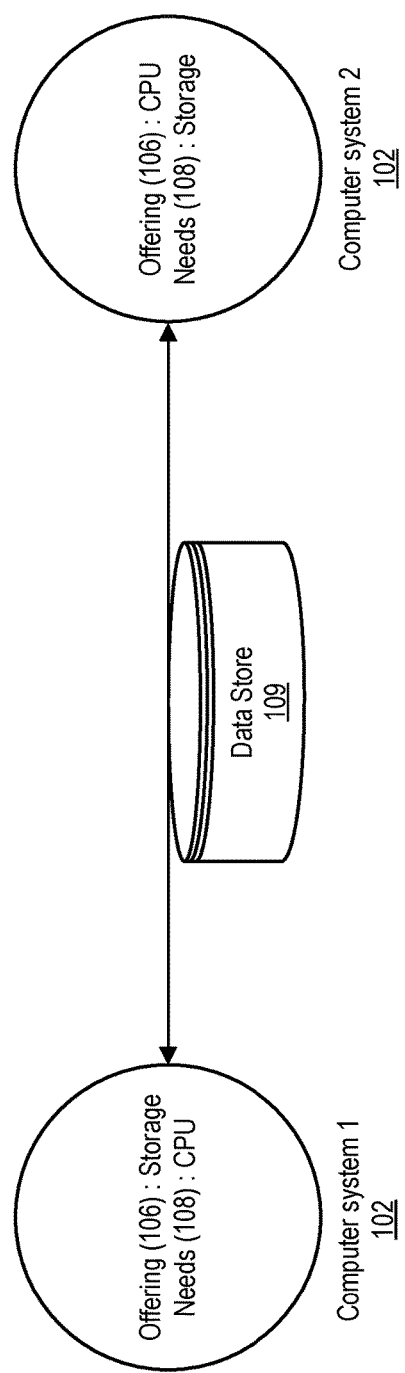
FIG. 6a and FIG. 6b are schematic diagrams showing examples of matching of clients with computer or business system resource capacity to clients with computer or business system resource needs.
Figure 6B:
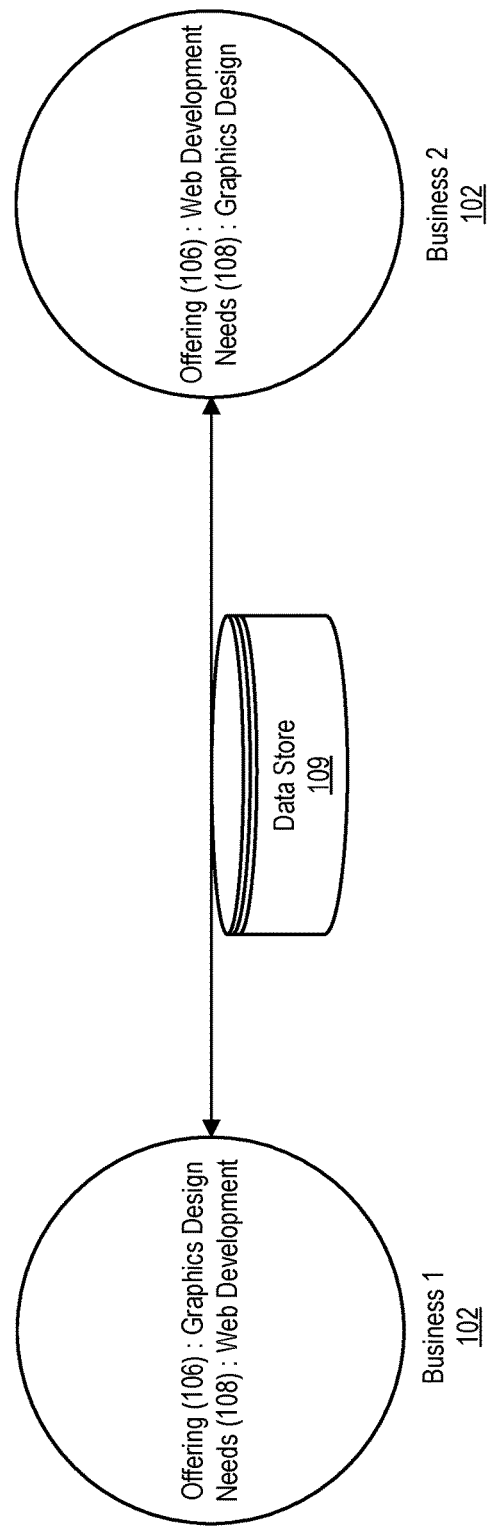

FIG. 6a and FIG. 6b is a schematic diagram showing an example of matching of clients with computer or business system resource capacity 106 to clients with computer or business system resource needs 108. FIG. 6a illustrates an exemplary embodiment showing systems as entities 102, where one system has capacity 106 of offering storage space and need 108 of CPU capacity whereas another system has capacity 106 of offering CPU capacity and need 108 of storage space thereby matching the capacities 106 and needs 108 of the entities 102 by the data store/server 109 to create an optimal use of both computer systems' resources. FIG. 6b illustrates an exemplary embodiment showing business organizations as entities 102, where a small business organization that specializes in graphic design as its capacity 106 but it cannot keep up with requests to create websites as its needs 108, where another small business organization that specializes in web development as its capacity 106 but it spends too much time in creating appealing graphic design as its needs 108, thereby matching the capacities 106 and needs 108 of the entities 102 by the data store/server 109 to create an optimal mutual benefit for both businesses. In above examples of FIG. 5a, FIG. 5b, FIG. 6a and FIG. 6b for simplicity of describing the invention a one-to-one relationship is shown, however in actual implementation one-to-one relationship or many-to-one relationship one-to-many relationship or many-to-many relationships may happen.

Figure 7:
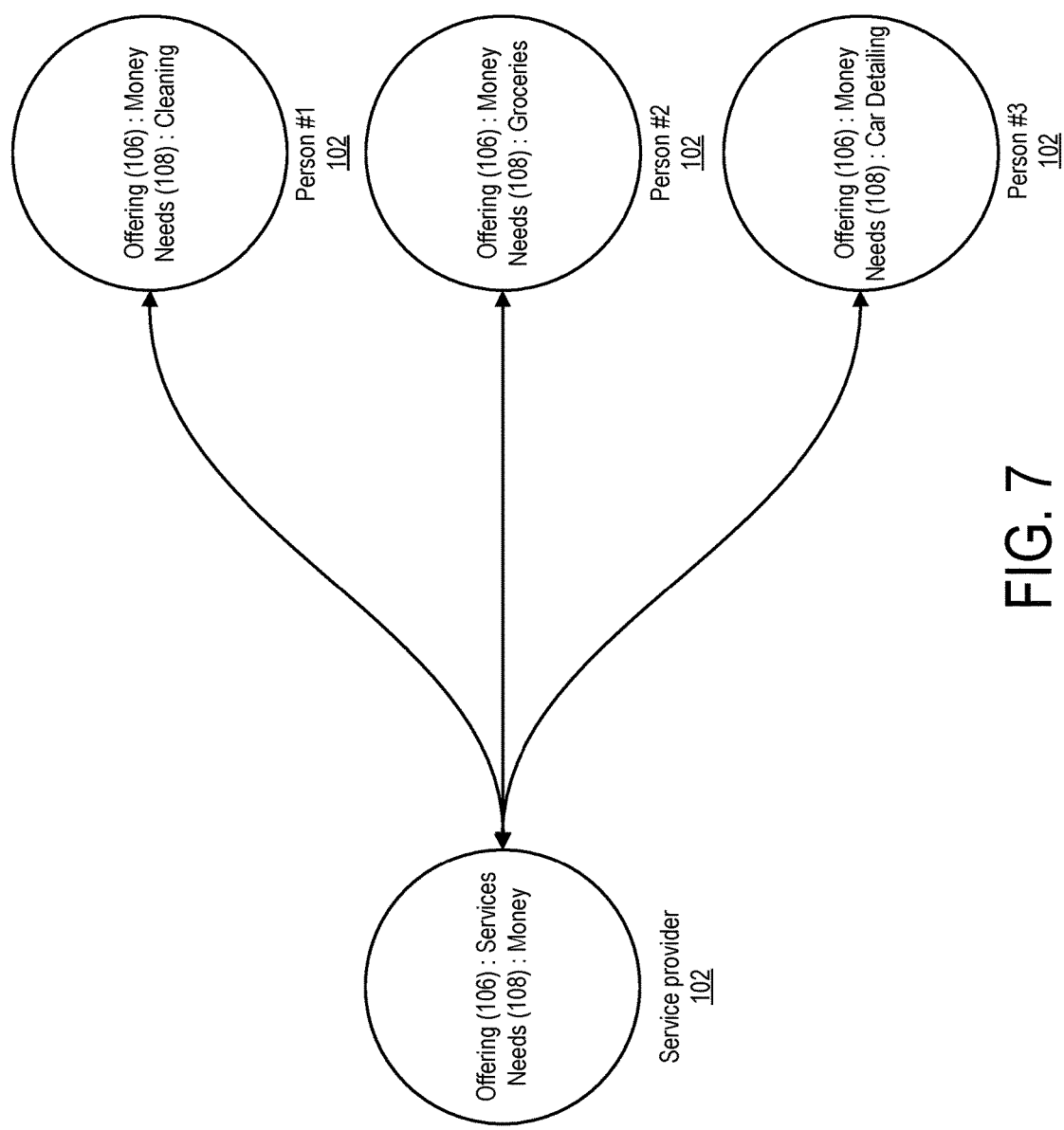
FIG. 7 is a schematic diagram showing an example matching of a business client with service resource capacity to customer clients with service resource needs.

FIG. 7 is a schematic diagram showing an example of matching of a business client/entity 102 with multiple capacities 106 to customer clients/entities 102 who needs one or more services as resource needs 108. Wherein the business entity needs 108 money in exchange to it its service capacities 106 and the customers need 108 services by paying with respect to their money paying capacities 106.

Figure 8:
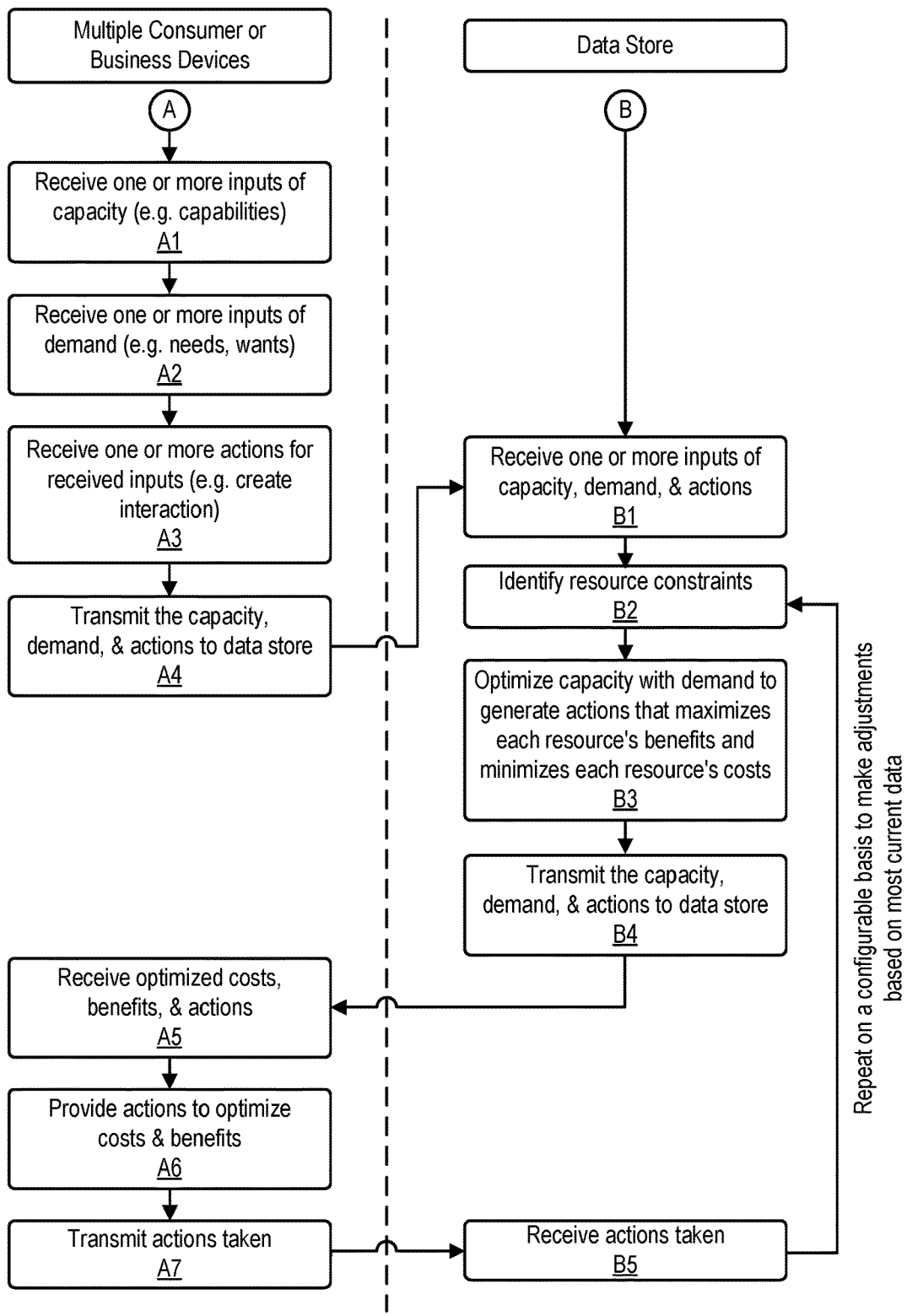
FIG. 8 is a schematic diagram showing a flow diagram of an alternate embodiment of the invention illustrating a method for optimally matching one or more capacities and one or more needs of entities while minimizing costs.

In an alternate embodiment of the invention, as shown in FIG. 8, illustrates a method for optimally matching one or more capacities and one or more needs of entities while minimizing costs comprising, providing input data (A1, A2, A3) including one or more capacities A1 and one or more needs A2 and one or more actions received for inputs from the entities or entity information (A3) of each entity through input device(s) A connected to each entity. Upon receiving the input data (A1, A2, A3) the input devices A transmit the input data (A1, A2, A3) to the data store B as shown in step A4. The data store B receives (B1) the input data (A1, A2, A3) and categorizes the input data (A1, A2, A3) based on the entity constraints or predefined parameters B2 and the processor of the data store B optimizes the capacity A1 with demand A2 to generate actions that maximizes each entity's/resource's benefits and minimizes each entity's/resource's costs as represented in step B3, then the datastore B transmits optimized costs, benefits, & actions to the entities' devices A as represented in step B4. Upon receiving the optimized costs, benefits, & actions by entities' devices A as represented in step A5 the entities provide actions to optimize cost and benefits (A6) through their devices A and is transmitted to the datastore as represented in step A7. The data store then receives the actions taken as represented in step B5. If the matching between the capacity A1 and demand A2 is still not optimized the process is repeated on a configurable basis to make adjustments based on the most current data.

In an exemplary embodiment of the system, all resources/entities 102 will also have variable needs 108 for how often optimizations occur, some resources/entities 102 will need to optimize more frequently than others. All resources/entities 102 will also have variable capacities 106 to adjust the frequency they are available for optimizations. All resources' optimization needs 108 and capacities 106 will fluctuate over time based on the resources inherent needs 108 and capacities 106. This optimization process should be able to generate Markov Chains or Global Cascades or other forms of efficiently & effectively using all available resources.

For example, a Global Cascades model may be used.

In one such example, individual resources may select one of two possible decisions (e.g. answering "yes" or "no"). A given resource is surrounded by other resources, and the choices of other resources ("neighbors") may influence the choice of any selected resource.

An implementation of the method may seek to identify which portions of the network of resources can trigger full optimization of the network.

The influence of any individual resource on another may be strong or weak based on the predetermined parameters, so matching may vary from strictly united one (under very strong influence) to chaotic distribution of individual decisions (under very weak influence).

All of the different types of resources are part of the network of resources. A change in one resource will have a strong influence among its neighbors and a weak influence on other resources based on network proximity.

The threshold $\phi$ corresponds to capacities and needs of an individual resource. The distribution $f(\phi)$ relates to portions of the resources in the network with the threshold specified. Probability $p_k$ relates to a portion of resources in the network, possessing exactly k neighbors.

As mentioned above, a given implementation may seek to use a moment generating function to trigger full network optimization. A moment generating function may is a purely technical function which dramatically decreases complexity of optimizing the network of resources. Using a moment generating function in a given implementation may be desirable.

The moment generations function in this example works in a non-obvious way. First, it does not require a list of resources comprising the network, because it never uses the predetermined parameters or specific resource capacities and needs. It only uses distribution of threshold. In discrete case the distribution would look like: 10% of the resources in the network possess threshold $\phi_1$, 20% people in the net possess threshold $\phi_2$, and the rest 70% possess threshold $\phi_3$. This distribution is assumed continuous, and is described by distribution density. Other implementations of the invention may use different distributions.

Second, the threshold $\phi$ is not a number of resources required for the network to modify its current state, it is rather a portion of neighbors required to change the resource's current state.

For example, a person may initially decline to purchase a new car but then changes his/her opinion not when (say) 3 weakly linked resources hold that opinion, but when (say) 40% of strongly linked resources purchase a new car. Thus the threshold is measured in the scale [0,1].

Next, the number of resources k varies from resource to resource in a random mode, that is, we know the probabilities $p_k$ that a person has exactly k neighbors, and we also know the average number of neighbors z.

The model is represented by a graph with nodes (resources) and edges (connections with neighbors).

Initially (at time 0) all the resources (nodes of a graph) are in the state 0. Then a small fraction $\Phi_0$ of the nodes is set to the state 1 (fully utilized). After that the process evolves according to the threshold distribution rules. The solution of the problem using this model is presented in the form of generating functions.

This model takes the following inputs;
    distribution of neighbors number, that is, the probabilities $p_k$, k=0,1,2, . . . ;
    probability density of a threshold $f(\phi)$, $\phi \in [0,1]$;
It then calculates intermediate parameters
    average number of neighbors (average "degree") $z = \Sigma_k k p_k$;
    Cumulative Distribution of a threshold $F(\phi) = \int_0^\phi f(t) dt$;
    Probability $\rho_k$ that a vertex with k neighbors is vulnerable, $\rho_k = F(1/k)$ k=1,2, . . . ;
    Generating function $G_0(x) = \Sigma_k \rho_k p_k x^k$;
    Its second derivative at 1: $G''_0(1) = \Sigma_k k(k-1) \rho_k p_k$;
and the output values of interest
    Vulnerable fraction of the network $$P_v = G_0(1) = \Sigma_k \rho_k p_k$$

Average degree of vulnerable vertices $$z_v = G'_0(1) = \Sigma_k k \rho_k p_k$$

Average vulnerable cluster size $$\langle n \rangle = G_0(1) + (G'_0(1))^2 / (z - G''_0(1)).$$

When $G''_0(1) < z$, the vulnerable clusters are small, under the opposite inequality $G''_0(1) > z$ the vulnerable clusters are infinite and all resources using the system will be impacted (works like a critical mass in chain reaction).

The output values of interest can then be used to identify portions of the network that can generate the desired network optimization.

Sample Pseudo-code

```
// Double slash means comment until the end of line
// Given: threshold distribution function F
// Maximum neighbors number N
// Distribution of neighbors number p(k), k=0, 1, ..., N
// Point x, in which one wants to calculate the MGF (typically x = 1)
G0 = 0         // variable for MGF value
G1 = 0         // variable for MGF derivative value
G2 = 0         // variable for MGF second derivative value
for k = 0 to N
if k <= 0 then rhok = 1 else rhok = F(1/k)
sk = phok* p(k)
G0 = G0 + sk
G1 = G1 + k* sk
G2 = G2 + k* (k-1)* sk
end            // k loop
// Values G0, G1, G2 are ready for using
```

One objective of the present invention is to provide a mutually beneficial system for sharing and matching resources' needs 108 and capacities 106.

Another objective is to provide a system, wherein the entities 102 of the systems 100 are an individual person or a group of people or a society or any resources, clients such as client users, business clients, customer clients or the like or an organization or an institution or a machine like a business system or a computer or a robot or the like who have specific one or more capacities 106 or needs 108 or both.

Yet another objective is to provide a system 100, wherein the capacities 106 and the needs 108 are resources that come in the forms of time, talents, money, materials, energy, services, people, knowledge, communication, and other tangible and intangible assets, thereby the matching of the capacities 106 and the needs 108 create shared value, which has practical benefits across numerous industries and verticals.

Yet another objective is to provide a system 100, wherein the categorized predetermined parameters 112 comprise location preferences, language preferences, availability preferences, communication preferences, demographic factors, business characteristics and other types of parameters that are used in the assessment of the capacities 106 and the needs 108 of the entities 102.

Yet another objective is to provide a system 100, wherein the entities 102 input data 104 including the capacities 106 and the needs 108 through an application program interface of the system 100.

Yet another objective is to provide a system 100, wherein the entities 102 receive their respective matched output data 124 in full view or summary view or any statistical analysis view over an interface of the system 100 or through communication device of the entities 102.

Yet another objective is to provide a system 100, wherein the entities 102 are interconnected with each other through the system via a network in a one-to-one relationship or many-to-one relationship or many-to-many relationships.

Yet another objective is to provide a system 100, wherein the matching of the capacities 106 and the needs 108 of the entities 102 are optimized to generate Markov Chains or Global Cascades or other efficient & effective uses of all available resources.

Yet another objective is to provide a system 100, wherein the processor 114 uses natural language processing, machine translation and similar technologies to generate processed data 116 and the processor 114 uses common lexicon or synonyms or similarities between the capacities 106 and the needs 108 for matching the processed data 116.

Yet another objective is to provide a system 100, wherein the entities 102 are authenticated using an authentication process that uses one or more, variable authentication factors that are based on the value of the capacities 106 and needs 108 being matched.

Yet another objective is to provide a system 100, wherein the system 100 uses a payment gateway for receiving an optional entity registration fee and monetizes the release of entity 102 and matched data 124 in full view or summary view or any statistical analysis view.

These and other advantages of the invention will be further understood and appreciated by those skilled in the art by reference to the following written specification, claims and appended drawings.

Because many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalence.

What is claimed is:

1. A capacity and need matching system comprising:
   multiple entities, wherein each entity provides input data including one or more capacities and one or more needs according to predetermined parameters;
   a computer-readable non-transitory memory to receive and store the input data including the capacities and the needs of the entities; and
   a processor categorizes the stored capacities and the needs of the entities to generate a processed data, wherein the processor compares the processed data and matches the processed data capacities of one or more entities to corresponding processed data needs of other entities based on the predetermined parameters to generate matched data, further based on the matched data, the processor generates matched output data and transmits the matched output data to the respective entities.

2. The system of claim 1, wherein the entities are an individual person or a group of people or a society, or an organization or an institution or a machine who have specific one or more capacities or needs or both.

3. The system of claim 1, wherein the capacities and the needs are resources that come in the forms of time, talents, money, materials, energy, services, people, knowledge, communication, and other tangible and intangible assets, thereby the matching of the capacities and the needs creates shared value, which has practical benefits across numerous industries and verticals.

4. The system of claim 1, wherein the predetermined parameters comprise location preferences, language preferences, availability preferences, communication preferences, demographic factors, business characteristics and other types of parameters that are used in the assessment of the capacities and the needs of the entities.

5. The system of claim 1, wherein the entities input data including the capacities and the needs though an application program interface of the system.

6. The system of claim 1, wherein the entities receive their respective matched output data in full view or summary view or any statistical analysis view over an interface of the system or through a communication device of the entities.

7. The system of claim 1, wherein the entities are interconnected with each other through the system via a network in a one-to-one relationship or many-to-one relationship or many-to-many relationships.

8. The system of claim 1, wherein the matching of the capacities and the needs of the entities are optimized by generating Markov Chains or Global Cascades or other forms of efficiently & effectively using all available resources.

9. The system of claim 1, wherein the processor uses natural language processing, machine translation and similar technologies to generate processed data and the processor uses common lexicon or synonyms or similarities between the capacities and the needs for matching the processed data.

10. The system of claim 1, wherein the entities are authenticated using an authentication process that uses authentication factors that are based on the value of the capacities and needs being matched.

11. The system of claim 1, wherein the system uses a payment gateway for receiving an optional entity registration fee and monetizes the release of entity and matched data in full view or summary view or any statistical analysis view.

12. A method for matching one or more capacities and one or more needs of entities comprising:
   providing input data including one or more capacities and one or more needs of each entity according to predetermined parameters;
   receiving and storing the input data including the capacities and the needs of the entities in a computer-readable non-transitory memory; and
   categorizing the stored capacities and the needs of the entities to generate a processed data by a processor, wherein the processor compares the processed data and matches the processed data capacities of one or more entities to corresponding processed data needs of other entities based on the predetermined parameters to generate matched data, further based on the matched data, the processor generates matched output data and transmits the matched output data to the respective entities.

13. The method of claim 12, wherein the entities are an individual person or a group of people or a society, or an organization or an institution or a machine who have specific one or more capacities or needs or both.

14. The method of claim 12, wherein the capacities and needs are resources that come in the forms of time, talents, money, materials, energy, services, people, knowledge, communication, and other tangible and intangible assets, thereby matching of the capacities and the needs create shared value, which has practical benefits across numerous industries and verticals.

15. The method of claim 12, wherein the predetermined parameters comprise location preferences, language preferences, availability preferences, communication preferences, demographic factors, business characteristics and other types of parameters that are used in the assessment of the capacities and needs of the entities.

16. The method of claim 12, wherein input data of the entities including the capacities and the needs are provided through an application program interface and the entities receive their respective matched output data in full view or summary view or any statistical analysis view over an interface or through communication device of the entities.

17. The method of claim 12, wherein the entities are interconnected with each other via a network in a one-to-one relationship or many-to-one relationship or many-to-many relationships.

18. The method of claim 12, wherein the matching of the capacities and the needs of the entities are optimized by generating Markov Chains or Global Cascades or other forms of efficiently & effectively using all available resources.

19. The method of claim 12, wherein the processor uses natural language processing, machine translation and similar technologies to generate processed data and the processor uses common lexicon or synonyms or similarities between the capacities and the needs for matching the processed data.

20. The method of claim 12, wherein the method uses a payment gateway for receiving an optional entity registration fee and monetizes the release of entity and matched data in full view or summary view or any statistical analysis view.

* * * * *